US011593281B2

(12) United States Patent
Lesartre et al.

(10) Patent No.: US 11,593,281 B2
(45) Date of Patent: Feb. 28, 2023

(54) DEVICE SUPPORTING ORDERED AND UNORDERED TRANSACTION CLASSES

(71) Applicant: Hewlett Packard Enterprise Development LP, Houston, TX (US)

(72) Inventors: Gregg B. Lesartre, Fort Collins, CO (US); Derek Alan Sherlock, Fort Collins, CO (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 782 days.

(21) Appl. No.: 16/406,549

(22) Filed: May 8, 2019

(65) Prior Publication Data
US 2020/0356497 A1 Nov. 12, 2020

(51) Int. Cl.
*G06F 13/16* (2006.01)
*H04L 49/253* (2022.01)
*G06F 9/46* (2006.01)

(52) U.S. Cl.
CPC .......... *G06F 13/1642* (2013.01); *G06F 9/462* (2013.01); *G06F 9/466* (2013.01); *H04L 49/254* (2013.01)

(58) Field of Classification Search
CPC ...... G06F 13/1642; G06F 9/462; G06F 9/466; G06F 9/4881; G06F 9/54; G06F 9/467; G06F 9/468; H04L 49/254
See application file for complete search history.

(56) References Cited

U.S. PATENT DOCUMENTS

| | | | | |
|---|---|---|---|---|
| 5,832,241 A * | 11/1998 | Guy | ..................... | G06F 13/4004 710/39 |
| 7,054,330 B1 * | 5/2006 | Chou | ...................... | H04L 47/50 370/461 |
| 7,249,192 B1 * | 7/2007 | Brewer | ................. | H04L 69/326 709/224 |
| 7,398,343 B1 * | 7/2008 | Marmash | ................ | G06F 13/24 710/262 |
| 7,417,637 B1 * | 8/2008 | Donham | ................ | G09G 5/393 345/506 |
| 7,802,303 B1 * | 9/2010 | Zhao | ....................... | G06F 21/564 709/224 |
| 8,352,727 B2 * | 1/2013 | Chen | ..................... | H04L 69/165 713/151 |
| 8,631,188 B1 * | 1/2014 | Heath | ................... | G06F 13/385 711/167 |
| 8,751,598 B1 * | 6/2014 | Shankar | .................. | H04L 69/40 707/613 |
| 9,489,304 B1 * | 11/2016 | Swarbrick | .............. | G06F 13/00 |
| 10,061,834 B1 * | 8/2018 | Kulesza | ................. | G06F 16/27 |
| 10,433,223 B2 * | 10/2019 | Brisebois | ............ | H04W 36/023 |
| 10,620,851 B1 * | 4/2020 | Shemer | ................. | G06F 16/122 |
| 2001/0055277 A1 * | 12/2001 | Steely, Jr. | .............. | H04L 47/29 370/236 |

(Continued)

Primary Examiner — Dung B Huynh
(74) Attorney, Agent, or Firm — Hewlett Packard Enterprise

(57) ABSTRACT

A communications device that includes a requester and a responder may support multiple transaction classes, including an ordered transaction class, while maintaining a bifurcated requester/responder architecture. Before a responder has a non-posted transaction response to transmit on an interconnect, it receives an indication from the requester that there is not a pending posted transaction on the interconnect.

20 Claims, 5 Drawing Sheets

(56) References Cited

U.S. PATENT DOCUMENTS

| | | | |
|---|---|---|---|
| 2002/0083274 A1* | 6/2002 | Gharachorloo | G06F 12/0828 711/144 |
| 2002/0146022 A1* | 10/2002 | Van Doren | H04L 49/506 370/429 |
| 2003/0005239 A1* | 1/2003 | Dover | G06F 13/1642 711/150 |
| 2003/0076831 A1* | 4/2003 | Van Doren | G06F 15/17375 370/412 |
| 2003/0126372 A1* | 7/2003 | Rand | G06F 12/0862 711/138 |
| 2003/0126376 A1* | 7/2003 | Blankenship | G06F 12/0835 711/146 |
| 2003/0163649 A1* | 8/2003 | Kapur | G06F 12/0862 711/146 |
| 2003/0204679 A1* | 10/2003 | Blankenship | G06F 12/0835 711/146 |
| 2004/0103088 A1* | 5/2004 | Cragun | G06F 16/2471 |
| 2005/0071485 A1* | 3/2005 | Ramagopal | H04L 67/104 709/230 |
| 2006/0045111 A1* | 3/2006 | Sinha | H04L 63/1458 370/474 |
| 2006/0123179 A1* | 6/2006 | Wong | G06F 13/4059 710/307 |
| 2006/0195309 A1* | 8/2006 | Stokkan | G06N 5/04 703/17 |
| 2007/0079075 A1* | 4/2007 | Collier | G06F 12/0822 711/146 |
| 2007/0258108 A1* | 11/2007 | Matsumoto | G06Q 10/087 358/1.15 |
| 2008/0077596 A1* | 3/2008 | Patton | H04L 67/568 |
| 2008/0081651 A1* | 4/2008 | Kuroda | H04L 1/1893 455/509 |
| 2008/0281905 A1* | 11/2008 | Langer | H04L 12/66 709/203 |
| 2008/0288834 A1* | 11/2008 | Manovit | G06F 11/3612 703/21 |
| 2009/0040981 A1* | 2/2009 | Agashe | H04L 1/1887 370/331 |
| 2009/0282419 A1* | 11/2009 | Mejdrich | H04L 49/109 719/314 |
| 2011/0225067 A1* | 9/2011 | Dunwoody | G06Q 20/40 705/40 |
| 2013/0060987 A1* | 3/2013 | Bolen | G06F 13/4081 710/316 |
| 2013/0117621 A1* | 5/2013 | Saraiya | H04L 49/356 714/E11.01 |
| 2014/0068131 A1* | 3/2014 | Murphy | G06F 13/368 710/306 |
| 2014/0189187 A1* | 7/2014 | Acharya | G06F 13/385 710/310 |
| 2014/0195490 A1* | 7/2014 | Leverett | G06F 16/128 707/639 |
| 2014/0281052 A1* | 9/2014 | Debendra | G06F 13/4022 710/19 |
| 2015/0052307 A1* | 2/2015 | Hirano | G06F 12/0855 711/125 |
| 2015/0143051 A1* | 5/2015 | Liu | G06F 12/084 711/130 |
| 2015/0181470 A1* | 6/2015 | Chai | H04W 36/0069 455/438 |
| 2015/0304494 A1* | 10/2015 | Corfield | H04M 3/42357 455/406 |
| 2016/0062749 A1* | 3/2016 | Stanfill | G06F 9/44505 717/144 |
| 2016/0124891 A1* | 5/2016 | Ahmad | G06F 13/1642 710/310 |
| 2016/0188209 A1* | 6/2016 | Hansson | G06F 13/16 711/156 |
| 2016/0308882 A1* | 10/2016 | Bortnikov | G06F 9/466 |
| 2016/0345219 A1* | 11/2016 | Brisebois | H04W 36/023 |
| 2017/0006608 A1* | 1/2017 | Josiam | H04L 27/2601 |
| 2017/0070868 A1* | 3/2017 | Allen | H04L 65/4061 |
| 2018/0004701 A1* | 1/2018 | Pappu | G06F 13/4282 |
| 2018/0197110 A1* | 7/2018 | Rao | G06F 30/398 |
| 2018/0198682 A1* | 7/2018 | Rao | H04L 41/145 |
| 2018/0203915 A1* | 7/2018 | Marshall | G06F 16/00 |
| 2018/0249443 A1* | 8/2018 | Li | H04L 12/1877 |
| 2018/0260160 A1* | 9/2018 | Sherlock | G06F 3/0685 |
| 2018/0267742 A1* | 9/2018 | Dinan | G06F 13/28 |
| 2019/0171398 A1* | 6/2019 | Ishida | G06F 3/1229 |
| 2019/0179754 A1* | 6/2019 | Steinmacher-Burow | G06F 12/0817 |
| 2019/0188164 A1* | 6/2019 | Avrukin | G06F 13/40 |
| 2019/0205278 A1* | 7/2019 | Panian | G06F 12/0833 |
| 2019/0294575 A1* | 9/2019 | Dennison | G06F 9/3877 |
| 2020/0267437 A1* | 8/2020 | Pantos | H04N 21/26258 |
| 2020/0356497 A1* | 11/2020 | Lesartre | G06F 9/462 |
| 2021/0075730 A1* | 3/2021 | Palermo | H04L 47/6255 |
| 2021/0183500 A1* | 6/2021 | Mandawat | G16H 30/20 |
| 2021/0359787 A1* | 11/2021 | Migault | H04L 1/1867 |
| 2022/0014381 A1* | 1/2022 | Xing | G06F 9/5077 |
| 2022/0299341 A1* | 9/2022 | Zhang | G01C 21/3819 |

* cited by examiner

DEVICE SUPPORTING ORDERED AND UNORDERED TRANSACTION CLASSES

BACKGROUND

Certain system interconnect communications protocols define various packet types that must be supported by components connected to the interconnect. For example, the protocol may define read requests, read responses, write requests, write acknowledgements, and various control packets. Legacy computer system interconnect such as PCIe provide correct behavior in part by specifying certain fabric ordering rules to guarantee transactions only become visible in the expected order. Some fabric interconnects such as Gen-Z are designed to remove these requirements in order to provide higher performance and reliability.

BRIEF DESCRIPTION OF THE DRAWINGS

Certain examples are described in the following detailed description and in reference to the drawings, in which.

DETAILED DESCRIPTION OF SPECIFIC EXAMPLES

Figure 1:
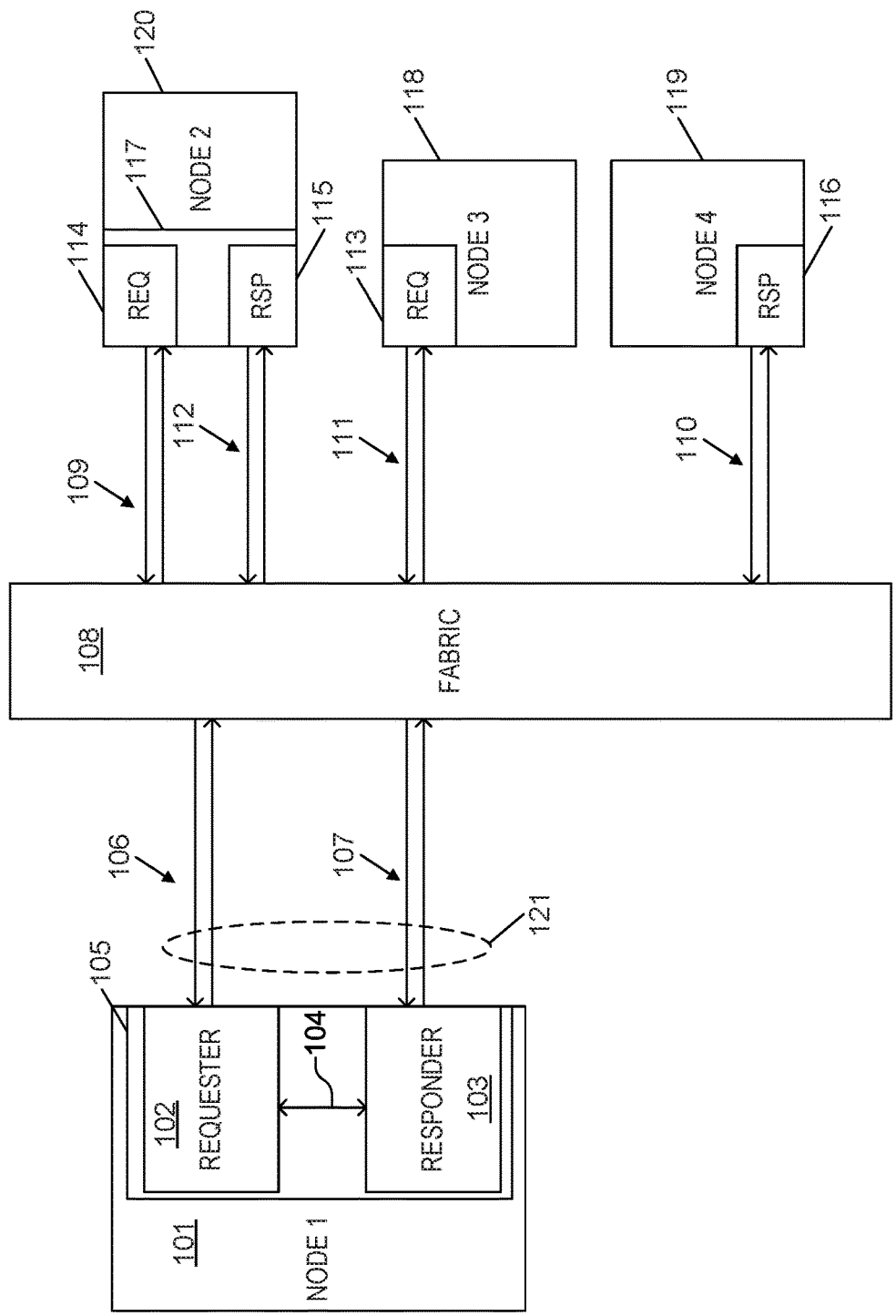
FIG. 1 illustrates an example system including a node on a fabric including both a requester and a responder.

Implementations of the described technology provide a system that supports multiple transaction classes using a split requester/responder architecture. The first transaction class may allow relaxed ordering, where packets may pass each other and arrive at the destination in an order different from how they were sent from the source. The second transaction class has a stricter ordering requirement, where certain types of packets cannot pass other types of packets within the class. For example, the second transaction class may include a posted write request packet type and a non-posted read response packet type where non-posted read responses may not pass posted write requests. For example, the first transaction class may be a set of core point-to-point Gen Z packet types while the second transaction class may be a set of Gen Z PCIe compatible ordering packet types.

A node may have a split architecture where a requester and a responder block inject packets onto a fabric independently of one another. The requester handles the injection of transaction requests, such as read requests and write requests onto the fabric. The responder handles the injection of transaction responses, such as read responses and write acknowledgements, onto the fabric. In some implementations, the requester and responder select packets from their respective queues independently of one another. The requester and responder inject packets of the first transaction class onto the fabric independently of another.

For responses of the second transaction class that cannot pass posted transaction requests of the second class, the responder queries the requester to determine if there is a pending posted transaction request bound for the same destination. If there is a pending posted transaction, the responder buffers the selected response until the requester indicates that the pending posted transaction is no longer be pending. This architecture allows the responder to use the same queuing, arbitration, and injection logic to handle transactions of both classes, reducing the amount of additional logic required to support both transaction classes. Additionally, the architecture may allow transactions of both classes to be supported by common routing logic within a switch fabric interconnecting the requesters and responders.

Some implementations support multiple virtual channels (VCs). VCs are logical packet streams that are sent across a single physical link. For example, a component may utilize multiple VCs to enable packet differentiation to provide varying service rates, levels of quality of service (QoS), facilitate multipath and dynamic routing, prevent deadlocks, or other features. A packet may be assigned to a VC by inclusion of a VC identifier as an information element associated with the packet.

In some implementations, packets of the second transaction class (request and response packets) are transmitted on a virtual channel separate from the virtual channel(s) used to transmit the packets of the first transaction class. In other implementations, request packets of the second transaction class are transmitted on one or more virtual channels and response packets of the second transaction class are transmitted on one or more different virtual channels. Both of these implementations may use the virtual channel information to maintain the ordering requirements for posted transaction requests of the second class. For example, in both of these implementations, the fabric may apply the same route to all posted request packets from a source to a destination.

In some implementations, the virtual channel(s) used for packets of the second transaction class may be separate from the virtual channel(s) used for packets of the first transaction class. For example, this may allow the packets of the second transaction class to have a static route through the fabric based on virtual channel without impacting the routing of the packets of the first transaction class. In other implementations, packets of both classes may use the same virtual channels. For example, read responses of both transaction classes may be sent on the same virtual channel while write requests of one class are sent on a different virtual channel than write requests of the other class. As a further example, write and read requests of both transaction classes may be sent on the same virtual channel(s) and other information elements may be used by the fabric for ordered routing of the posted transaction requests of the second transaction class.

FIG. 1 illustrates an example of a plurality of nodes connected via a packet switched fabric 108. The nodes 101, 118, 119, 120 may be various different components. For example, a node may include a processor or system on a chip (SOC) having an integrated memory or storage controller, a memory module such as a dynamic random access memory (DRAM), non-volatile memory (NVM), or storage class memory (SCM) module, a graphics card or other accelerator, a network controller, a switch, a digital signal processor, a custom application specific integrated circuit (ASIC) or field programmable gate array (FPGA) or other device that communicates using a memory-semantic communication protocol. In the memory-semantic protocol, communications correspond to a load/store processor architecture. Communications between components may be performed using read and write requests to specific addresses, for example, at the byte address level. However, the read and write requests are not necessarily limited to reading and writing data to memory or byte-addressable storage. For example, an accelerator may expose a range of addresses that may be read from and written to in order to access an accelerator work queue or read from a completion queue.

In the illustrated example, the nodes are connected via a switch fabric 108. The switch fabric 108 may comprise a plurality packet switches that connect the components in a topology, such as an all-to-all topology. In other examples, the nodes may be interconnected in a variety of different manners. For example, the nodes may be switch attached, direct attached, or daisy-chained.

Each node component 101, 118, 119, 120 includes a component interface. Different components may have interface configurations. For example, nodes 101 and 120 have interfaces 105, 117 comprising a requester 102, 114 and a responder 103, 115; node 118 has an interface 113 comprising a requester but no responder; and node 119 has an interface 116 comprising a responder but no requester. In this architecture, requesters 102, 114, 113 transmit requests to responders 103, 115, 116 and responders 103, 115, 116 transmit responses to received requests. For sake of explanation, each interface block (i.e., each requester 120, 114, 113, and each responder 103, 112, 110) is illustrated with an individual link 106, 107, 109-112, to the fabric 108. In some deployments, the individual links might be logical rather than physical. For example, links 106 and 107 may be implemented by time multiplexing on a single duplex links, or another method of providing dedicated logical links on a shared physical link may be employed.

In this example, the requester 102 and the responder 103 of interface 105 support a first transaction class and a second transaction class.

The first transaction class includes a plurality of memory-semantic packet types that have a relaxed ordering model. For example, the first transaction class may include read requests, read responses, and write requests.

The read requests may be transmitted by requesters 102, 114, 113 to responders 103, 115, 116. They are packets that request data to be read out and returned from a memory address defined by the read request. The read responses are transmitted by responders 103, 115, 116 to requesters 102, 114, 113 to return the data requested by a corresponding read request. The first transaction class may include a single or multiple types of read requests. For example, the first transaction class may include different types of read requests to read N bytes of data starting at an indicated address, where N varies depending on the request type (for example, the component may support a "Read 32" request to read 32 bytes of data starting at an address contained in the request or a "Read 64" request to read 64 bytes of data starting at an address contained in the request).

Write requests are transmitted by requesters and are packets that request data to be written to a specified address. The write requests may include a starting memory address and a payload to be written to the memory at the starting memory address. In some implementations, the write requests may be acknowledged by an acknowledgement packet transmitted by the responder after execution of the requested write. In other implementations, the write requests may be unacknowledged by the receiving responders. In further implementations, the architecture may support both acknowledged and unacknowledged write requests within the first transaction class.

The second transaction class includes posted write requests, non-posted requests, and responses.

A posted request does not require waiting for a request completion response to indicate success or failure of the request. For example, when issuing a posted write request, the source of the request may treat the request as completed as soon as its requester sends the request on the fabric, without waiting to receive an acknowledgement from a receiving responder. For example, the component within the requesting source that caused the request to be transmitted, such as an application or operating system (OS) running on the node, may treat the posted request as completed once the requester sends the posted request.

A non-posted request requires a completion response to indicate success or failure of the request, or to provide the requested data. For example, when the memory controller above issues a non-posted read, the memory controller must wait for the requested data to be returned by a responder. As another example, the second transaction class may also include non-posted write requests. A requester issuing a non-posted write request waits for a write acknowledgement before acting in a manner that assumes completion of the non-posted write request.

The second transaction class has an ordering model where posted requests can pass non-posted requests and responses to the same destination, and no request or response can pass a posted request to the same destination. For example, the ordering model may be a PCIe compatible ordering model.

In some implementations, the first and second transaction classes may share packet types or formats. For example, metadata tag, such as an information element in a write request packet header may indicate whether the write request is of the first transaction class or the second transaction class. Additionally, if the request is of the second class, an information element may indicate whether the request is a posted or a non-posted request.

Returning to FIG. 1, the responder 103 is send transactions of the first class independently of transactions of the first class sent by the requester 102. For example, the responder 103 may conduct queuing and priority arbitration decisions independently of queuing and priority arbitration performed by the requester 102. For instance, the responder 103 may have a read response queue of pending read responses to send to requesters on other nodes 118-120. The responder may select a read response from the queue and transmit the read response over the link 107 independently of the status of any requests that the requester 102 may have in its own queues or that may be pending on the fabric 108.

In some cases, responders 103, 115, 116 are configured to send acknowledgements to requesters for posted transaction requests of the second transaction class. In some cases, these acknowledgements may be provided upon receipt of the posted transaction request at the responder. In other cases, these acknowledgements may be provided after the requested transaction has completed.

For example, for a posted write request, in some implementations, responder 115 sends the acknowledgement of receipt of the posted write request independently of whether or not the data within the request has been written to its medium. This may be implemented when written data is visible to a subsequent read before the data is actually written to the responder's medium. For example, this may be implemented if the responder can service a subsequent read from a write buffer while performing the write in parallel.

In other implementations, responder 115 sends the acknowledgement of receipt after the write request has completed. For example, this may occur when a write is not visible to a subsequent read until it is stored in the responder's media. As another example, this may occur when a write is required to be persistent and it must be committed to a non-volatile data storage medium before it can be treated as persistent. (In comparison, in an example where a write must be persistent before subsequent reads but the responder includes a battery or capacitor—backed volatile cache for its non-volatile medium, the posted write acknowledgement might be sent before the responder commits the data to its non-volatile medium.)

The requester 102 uses the acknowledgments to posted transaction requests to track the pendency of a posted transaction request of the second transaction class on the fabric. In other words, the requester 102 indicates that a posted transaction is pending from when it is sent on the fabric 108 to when an acknowledgement of traversal is received from the destination. In some implementations, this acknowledgement is not provided to the source of the request. In other words, because the requesting component could treat the posted transaction request as complete when the posted transaction request was sent, it does not need an acknowledgment that the posted transaction request was received.

The system further includes a communication channel 104 between the responder 103 and the requester 102. The responder 103 uses the channel 104 to receive an indication from the requester 102 indicating whether the requester 102 has a pending preceding posted transaction request of the second transaction class before sending a non-posted transaction response of the second transaction class. For example, the channel 104 may be a bus or other communication link between the requester 102 and the responder 103, may be a port to a register set, table or other data structure that the requester 102 maintains, or other channel.

In some implementations, the responder 104 does not send a non-posted response to a destination if there is a pending posted transaction of the second transaction class sent by the requester to that destination. For example, when the responder 103 selects a transaction response from the second class destined for node X (i.e., one of nodes 118, or 120), the responder 103 queries the requester to determine if there is a pending posted transaction request for node X. In other implementations, the responder 104 does not send a non-posted response of the second transaction class to any destination if there is a pending posted transaction of the second transaction class sent by the requester to any destination.

In some cases, the responder 103 delays sending the non-posted transaction response until after the requester 102 does not have any pending preceding posted transaction request for the same destination as the non-posted transaction. For example, the responder 103 may buffer non-posted transaction responses until receiving indication that there is not a preceding posted transaction request to the same destination. By waiting for these posted write requests to complete before issuing the read response this solution eliminates the need for the rest of the fabric to manage the ordering of these flows. The read response cannot pass the posted request because the request has already completed.

Figure 2:
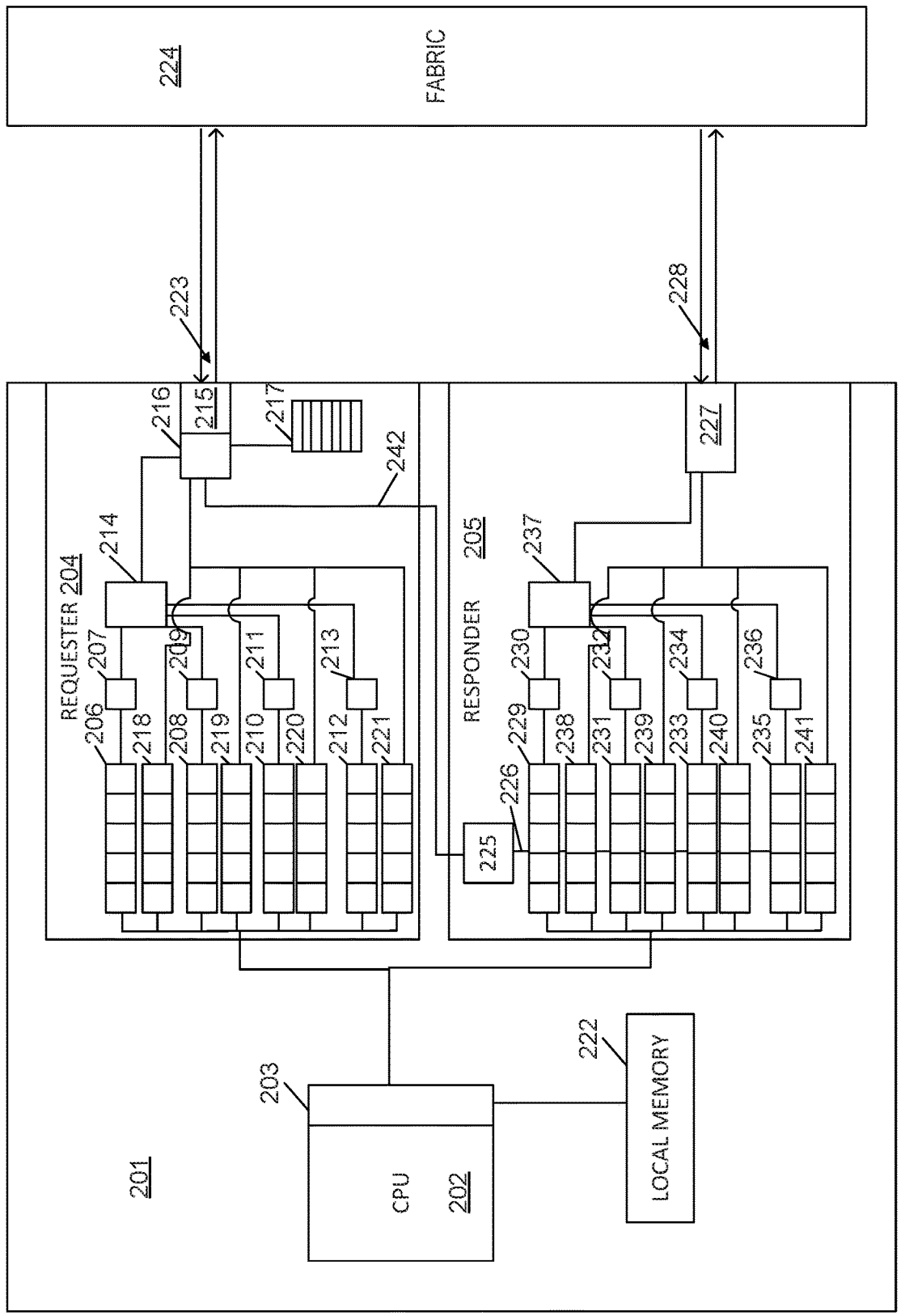
FIG. 2 illustrates an example device including a requester and a responder.

FIG. 2 illustrates an example device including a bifurcated requester and responder. For example, the device 201 may be an implementation of a device such as node 1 101 as described with respect to FIG. 1. The illustrated system components are illustrated as logic blocks, which may be implemented in hardware as digital circuitry, as firmware or software stored in a non-transitory medium such as flash memory or a ROM, or as a combination thereof.

The device 201 comprises a system compute node having a requester 204 and a responder 205. For purposes of explanation, the device 201 includes a CPU 202 comprising a memory controller 203 coupled to the requester 204 and responder 204 as well as a local memory 222. As discussed above, in other implementations, the device 201 may be a memory module such as a dynamic random access memory (DRAM), non-volatile memory (NVM), or storage class memory (SCM) module. In such an implementation, instead of a CPU 202 the device could include a media controller with an interface to a memory or storage device, and an interface to the requester 204 and responder 205. In further implementations, the device 201 may be a graphics card or other accelerator, a network controller, a switch, a digital signal processor, a custom application specific integrated circuit (ASIC) or field programmable gate array (FPGA) or other device that communicates using a memory-semantic communication protocol.

The device 201 comprises a requester 204 to support a first transaction class and a second transaction class. The requester comprises a plurality of request transmit queues 206, 208, 210, 212. In this example, the requester supports four virtual channels (VCs) and maintains a separate transmit queue 206, 208, 210, 212 for each virtual channel. While the requester 204 is illustrated with four VCs, implementations may have a larger or smaller number of VCs, or may have only a single channel (which may be considered an implicit VC). In some implementations, the memory controller 203 or CPU 202 generates the packets to be transmitted and places them directly into the queues 206, 208, 210, 212, including assigning the packets to their VC. In other implementations, the CPU 202 transmits requests such as load or store requests to the requester 204, responder 205, or an intervening component (not pictured), which then generates the appropriate transaction packets to implement the CPU request.

Each queue 206, 208, 210, 212 is coupled a queue arbiter 207, 209, 211, 213, respectively. The queue arbiter 207, 209, 211, 213 selects a packet from its respective queue 206, 208, 210, 212. For example, the queue arbiter 207 may apply one of various types of priority based packet selection to select a packet from the queue. The different arbiters 207, 209, 211, 213 may apply different prioritization techniques, or may apply the same technique. In some implementations, some or all of the arbiters 207, 209, 211, 213 are not present, and, instead, the queues 206, 208, 210, 212 are first-in, first-out (FIFO) buffers.

A VC arbiter 214 selects a packet to transmit from the candidate packets from the different VCs (i.e., from the different queue arbiters 207, 209, 211, 213 or from the head of the FIFO buffers if there is no queue arbitration). The VC arbiter 214 may apply various different arbitration algorithms to select the packet for transmission. For example, the arbiter 214 may apply a round robin technique, an age-based prioritization, or a weighted version of one of those algorithms to select the packet for transmission. The selected packet is sent to the requester transceiver 215 for injection onto a link 223 into the fabric 224 for transmission to the packet's destination.

The requester 204 further comprises a plurality of receive queues 218, 219, 220, 221. Each receive queue 218, 219, 220, 221 corresponds to one of the VCs supported by the requester 204. For example, the receive queues 218, 219, 220, 221 may be FIFO buffers that store responses to requests previously transmitted by the requester.

The requester 204 further comprises a tracker 216 to track end-to-end traversal of posted transaction requests of the second transaction class. In this example, the tracker 216 is coupled to the transceiver 215 and is interposed between the VC arbiter 214 and the transceiver 215. This allows the tracker 216 to inspect packets before they are transmitted and to track posted transaction requests of the second transaction class. In other implementations, the tracker 216 may be located off of the main packet transmit and receive paths. For example, the tracker 216 may snoop the bus between the VC arbiter 214 and the transceiver 215 to determine when a posted transaction request is transmitted.

The tracker 216 is further coupled to a data structure 217 that it maintains to track in-flight posted transaction requests of the second transaction class. The tracker 216 may maintain the data structure in various manners. For example, the data structure 217 may be a table, where each entry corresponds to an in-flight posted transaction request. For example, each entry may include a destination and ID of an in-flight posted transaction. When the transceiver 215 receives an acknowledgement of posted transaction traversal, the tracker 216 may clear the entry corresponding to the posted transaction. As another example, each entry may include a destination ID and a counter that the tracker increments each time a posted transaction is sent to the corresponding ID, and decrements each time a posted transaction acknowledgment is received. In this example, the tracker may clear the table entry when the counter reaches 0.

As discussed above, a posted transaction request may be treated as completed once it is transmitted. For example, an application running on the CPU 202 may treat a posted write request as soon as it is injected onto the fabric 224. Accordingly, the posted transaction traversal acknowledgements received by the requester 204 may be discarded after the tracker 216 uses the acknowledgement to track traversal of the transaction request. For example, if the tracker 216 is in the path between the receive queues 218, 219, 220, 221, the tracker 216 may discard posted transaction traversal acknowledgements without passing them to receive queue management logic.

The device 201 further comprises a responder 205 to support a first transaction class and a second transaction class. The responder 205 comprises a plurality of receive queues 238, 239, 240, 241. For example, the receive queues 238, 239, 240, 241 may be FIFO buffers that store received requests. In this example, the responder supports four virtual channels (VCs) and maintains a separate receive queue 238, 239, 240, 241 for each VC. In some examples, some or all of the VCs supported by the responder 205 are the same VCs as those supported by the requester 204. For example, the VCs may be differentiated by ID numbers and the VCs supported by the responder may have the same or an overlapping set of ID numbers.

As described above, the responder receives requests from other requesters via the fabric 224. These requests are queued in the queues 238, 239, 240, 241. The requests are then passed to the memory controller 203 which services the request, or passes the request to another component to be serviced. For example, upon receiving a read request requesting data in the local memory 222, the memory controller 203 retrieves the data from the memory and returns the data to the responder 205 for transmission to the request in a read response packet.

The responder 205 comprises a plurality of response transmit queues 229, 231, 233, 235. In this example, the responder supports four virtual channels (VCs) and maintains a separate transmit queue 229, 231, 233, 235 for each virtual channel. In some implementations, the responder 205 may send response packets of the second transaction class on a different VC than the requester 204 uses to send request packets of the second transaction class.

In some implementations, the memory controller 203 or CPU 202 generates response packets to be transmitted and places them directly into the queues 229, 231, 233, 235, including assigning the packets to their VC. In another example, the memory controller 203 or other component returns the data in a raw or other format and the responder 205 or an intervening component packages the data into an appropriate response packet and places the response into one of the queues 229, 231, 233, 235.

The responder 205 includes a pending transaction checker 225. The checker 225 includes a sideband interface 226 into the queues 229, 231, 233, 235. In some implementations, the checker 225 monitors response packets as they enter the queues 229, 231, 233, 235. In other implementations, one or more of the VCs (and therefore, queues) is dedicated to responses of the second transaction class. In these implementations, the checker 225 may monitor only the response packets that are placed into the dedicated queues.

In this example, if a monitored response packet is of the second transaction class, the checker 225 tags the packet as unavailable to transmit and queries the requester 204 via an interface 242 to receive an indication of end-to-end traversal of a posted transaction request. For example, the interface 242 may be coupled to the tracker 216 or data structure 217. In one implementation, the checker 225 may retrieve a response destination ID (i.e. the source of the request requiring the response) from the monitored packet and transmit the response destination ID to check whether there is a pending preceding posted transaction having the same destination node as the non-posted response. In another implementation, the checker 225 checks whether there is any pending preceding posted transaction. Once the checker 225 receives a response indicating that there is not a pending posted transaction, the checker 225 clears the unavailability tag from the queued response packet.

In another example, the component generating the response packets of the second transaction class may create the packets with the unavailable tag. As another example, unavailable tags are not used. Instead, response packets of the second transaction class are only tagged as available once the checker 225 determines from the requester 204 that the preceding posted write transaction of the second transaction class has completed. In this example, the queue arbiters 230, 232, 234, 236 only select from transactions of the second class that have availability tags.

Each queue 229, 231, 233, 235 is coupled a queue arbiter 230, 232, 234, 236, respectively. The queue arbiter 230, 232, 234, 236 selects a packet from its respective queue 229, 231, 233, 235. The queue arbiter 230, 232, 234, 236 may apply one of various types of priority based packet selection to select a packet from the queue. The different arbiters 230, 232, 234, 236 may apply different prioritization techniques, or may apply the same technique. In some implementations, some or all of the arbiters 230, 232, 234, 236 are not present, and, instead, the queues 230, 232, 234, 236 are first-in, first-out (FIFO) buffers.

The queue arbiters 230, 232, 234, 236 managing queues that store responses of the second transaction class are configured not to select packets with an unavailability tag. Accordingly, the applicable queues 230, 232, 234, 236 buffer the transaction response until the unavailability tags are cleared. As described above, a response packet's unavailability tag is cleared after the checker receives an indication that preceding posted transactions of the second transaction class (either any preceding posted transaction or a preceding posted transaction to the same destination, depending on implementation) have completed end-to-end traversal.

In an implementation with FIFO queues and without queue arbiters 229, 231, 233, 235, rather than tagging the response packets of the second transaction class, the checker 225 may remove the packets from the queue or prevent them from being queued until receiving the indication that the preceding posted write requests of the second class have completed end-to-end traversal.

A VC arbiter 237 selects a packet to transmit from the candidate packets from the different VCs (i.e., from the different queue arbiters 230, 232, 234, 236 or from the head of the FIFO buffers if there is no queue arbitration). The VC arbiter 237 may apply various different arbitration algorithms to select the packet for transmission. For example, the arbiter 237 may apply a round robin technique, an age-based prioritization, or a weighted version of one of those algorithms to select the packet for transmission. The selected packet is sent to the responder transceiver 227 for injection onto a link 228 into the fabric 224 for transmission to the packet's destination.

The responder 205 is further configured to transmit an end-to-end traversal acknowledgement to an external requester after receiving a posted transaction request of the second transaction class from the external requester. In some implementations, logic in responder 205, such as the checker 225 may generate and send the acknowledgements. For example, the checker 225 may be coupled to and monitors the receive queues and may generate the traversal acknowledgements. In this example, the checker 225 may then enqueue the traversal acknowledgement in one of the transmit queues 229, 231, 233, 235. In other implementations, the traversal acknowledgements may be generated after a request has completed as discussed above with respect to FIG. 1.

Figure 3:
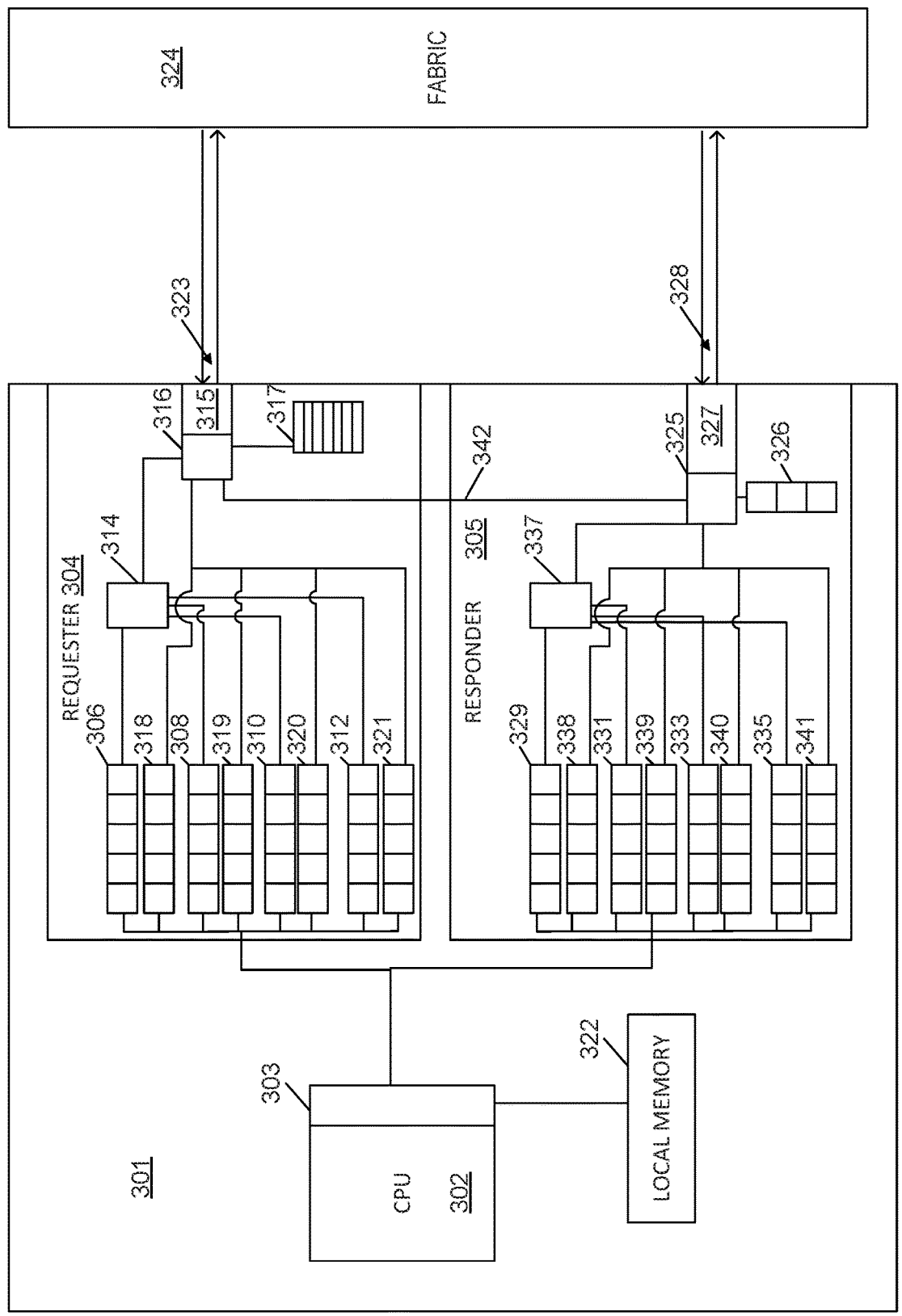
FIG. 3 illustrates an example device including a requester and a responder.

FIG. 3 illustrates an example device including a bifurcated requester and responder. For example, the device 301 may be an implementation of a device such as node 1 101 as described with respect to FIG. 1. The illustrated system components are illustrated as logic blocks, which may be implemented in hardware as digital circuitry, as firmware or software stored in a non-transitory medium such as flash memory or a ROM, or as a combination thereof.

The device 301 comprises a system compute node having a requester 304 and a responder 305. For purposes of explanation, the device 301 includes a CPU 302 comprising a memory controller 303 coupled to the requester 304 and responder 305 as well as a local memory 322. These elements may be as described with respect to CPU 202, memory controller 203, and local memory 222. As discussed above, in other implementations, the device 301 may be a memory module such as a dynamic random access memory (DRAM), non-volatile memory (NVM), or storage class memory (SCM) module, a graphics card or other accelerator, a network controller, a switch, a DSP, an ASIC, an FPGA or other device that communicates using a memory semantic protocol.

The device 301 further comprises a requester 304 to support a first transaction class and a second transaction class. The requester comprises a plurality of request transmit queues 306, 308, 310, 312. In this example, the requester supports four virtual channels (VCs) and maintains a separate transmit queue 306, 308, 310, 312 for each virtual channel. In this example, the queues 306, 308, 310, 312 are FIFO buffers. Each buffer is coupled to a VC arbiter 314, which selects a packet to transmit from the heads of the buffers. The VC arbiter 314 may apply various different arbitration algorithms, as described with respect to VC arbiter 214. In other implementations, the queues may be coupled to queue arbiters that select candidate packets from the queues 306, 308, 310, 312

The requester 304 further comprises a plurality of receive queues 318, 319, 320, 321. Each receive queue 318, 319, 320, 321 corresponds to one of the VCs supported by the requester 304. For example, the receive queues 318, 319, 320, 321 may be FIFO buffers that store responses to requests previously transmitted by the requester.

The requester 304 further comprises a tracker 316 track end-to-end traversal of posted transaction requests of the second transaction class. In this example, the tracker 316 is coupled to the transceiver 315 and is interposed between the VC arbiter 314 and the transceiver 315. This allows the tracker 316 to inspect packets before they are transmitted and to track posted transaction requests of the second transaction class. In other implementations, the tracker 316 may be located off of the main packet transmit and receive paths. For example, the tracker 316 may snoop the bus between the VC arbiter 314 and the transceiver 315 to determine when a posted transaction request is transmitted.

The tracker 316 is further coupled to a data structure 317 that it maintains to track in-flight posted transaction requests of the second transaction class. The tracker 316 may maintain the data structure in various manners. For example, the data structure 317 may be a table, where each entry corresponds to an in-flight posted transaction request. For example, each entry may include a destination and ID of an in-flight posted transaction. When the transceiver 315 receives an acknowledgement of posted transaction traversal, the tracker 316 may clear the entry corresponding to the posted transaction. As another example, each entry may include a destination ID and a counter that the tracker increments each time a posted transaction is sent to the corresponding ID, and decrements each time a posted transaction acknowledgment is received. In this example, the tracker may clear the table entry when the counter reaches 0.

The device 301 further comprises a responder 305 to support a first transaction class and a second transaction class. The responder 305 comprises a plurality of receive queues 338, 339, 340, 341. For example, the receive queues 338, 339, 340, 341 may be FIFO buffers that store received requests. In this example, the responder supports four virtual channels (VCs) and maintains a separate receive queue 338, 339, 340, 341 for each VC. In some examples, some or all of the VCs supported by the responder 305 are VCs are the same as those supported by the requester 304. For example, the VCs may be differentiated by ID numbers and the VCs supported by the responder may have the same or an overlapping set of ID numbers.

As described above, the responder receives requests from other requesters via the fabric 324. These requests are queued in the queues 338, 339, 340, 341. The requests are then passed to the memory controller 303 which services the request, or passes the request to another component to be serviced. For example, upon receiving a read request requesting data in the local memory 322, the memory controller 303 retrieves the data from the memory and returns the data to the responder 305 for transmission to the request in a read response packet.

The responder 305 comprises a plurality of response transmit queues 329, 331, 333, 335. In this example, the responder supports four virtual channels (VCs) and maintains a separate transmit queue 329, 331, 333, 335 for each virtual channel. In some implementations, the responder 305 may send response packets of the second transaction class on a different VC than the requester 304 uses to send request packets of the second transaction class.

In some implementations, the memory controller 303 or CPU 302 generates response packets to be transmitted and places them directly into the queues 329, 331, 333, 335, including assigning the packets to their VC. In another example, the memory controller 303 or other component returns the data in a raw or other format and the responder 305 or an intervening component packages the data into an appropriate response packet and places the response into one of the queues 329, 331, 333, 335.

In this example, each transmit queue 329, 331, 333, 335 is a FIFO buffer coupled to a VC arbiter 337. In other examples, the queues may be coupled to queue arbiters as described with respect to FIG. 2. The VC arbiter 337 selects a packet to transmit from the candidate packets from the heads of the FIFO buffers 329, 331, 333, 335. The VC arbiter 337 may apply various arbitration techniques as described with respect to VC arbiter 227. The selected packet is sent to the responder transceiver 327 for injection onto a link 328 into the fabric 324 for transmission to the packet's destination.

The responder 305 further comprises an enqueuer 325. The enqueuer 325 is coupled to an interface 342 to the requester 304 to receive an indication of end-to-end traversal of a posted transaction request from the tracker. For example, the interface 342 may be coupled to the tracker 316 or data structure 317. When the arbiter 337 selects a response of the second transaction class, such as a non-posted read response, for transmission on the link 328, the enqueuer 325 checks whether there is a pending posted transaction sent by the requester 304. For example, the enqueuer 325 may check whether there is a pending posted transaction having the same destination as the non-posted response. Alternatively, the enqueuer 325 may check whether there is any pending posted transaction to any destination.

The responder 305 further comprises a transceiver 327 to transmit the selected transaction response based on the indication. For example, the responder 305 may buffer the selected transaction response in a buffer 326 while there is a pending posted transaction preventing the transmission of the selected response. The buffer 326 may be sized to buffer multiple pending responses. For example, the buffer 326 may be sized according to the typical round trip latency of posted transactions on the fabric and the responder's packet transmission rate.

The responder 305 is further configured to transmit an end-to-end traversal acknowledgement to an external requester after receiving a posted transaction request of the second transaction class from the external requester. In some implementations, logic in responder 305, such as the transceiver 327 or enqueuer 225 may generate and send the acknowledgements. In other implementations, the other system components may generate the traversal response after the corresponding request has completed.

Figure 4:
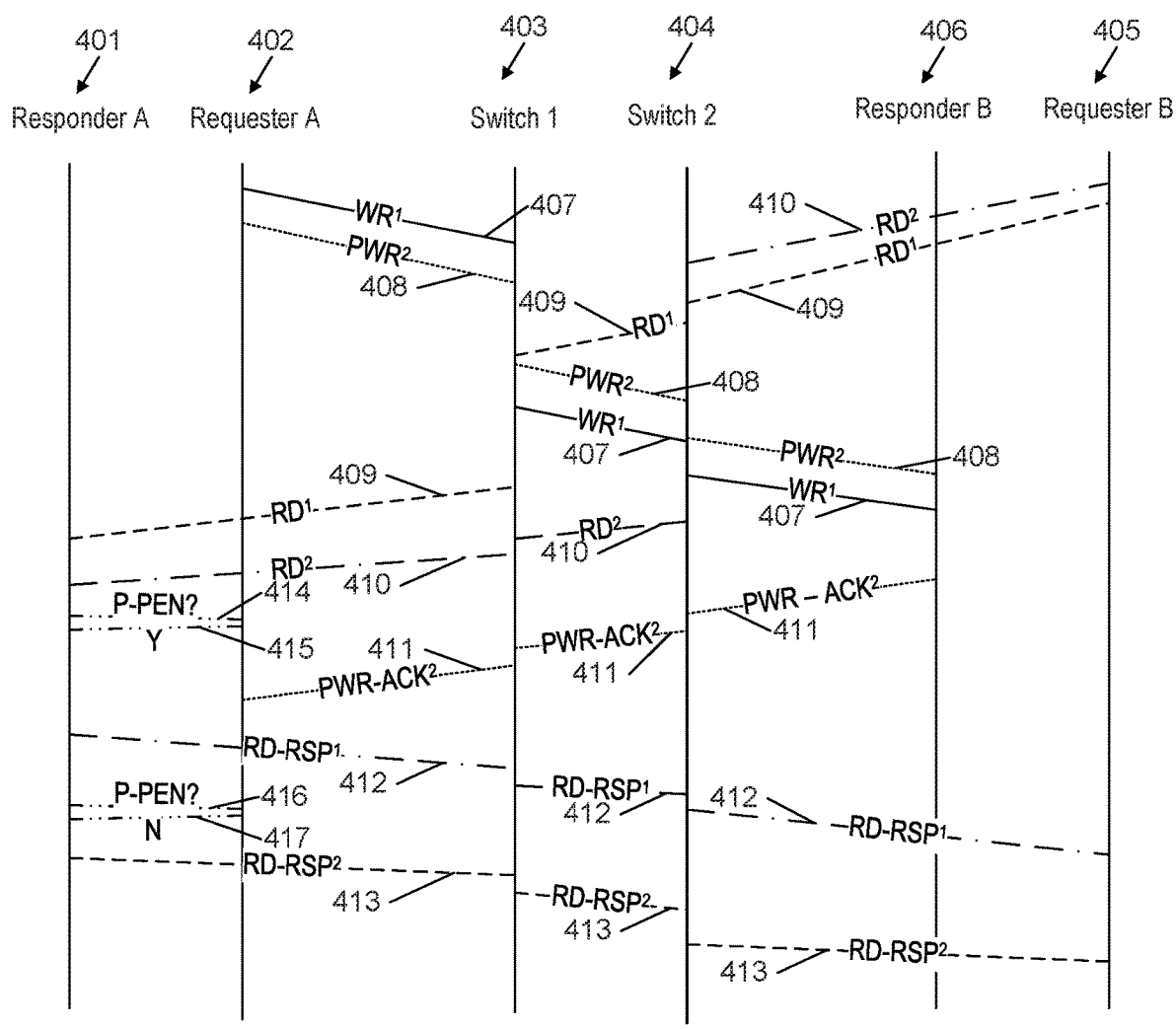
FIG. 4 is a communications bounce diagram illustrating an example series of communications between a first requester and responder at a first destination and a second requester and responder at a second destination.

FIG. 4 illustrates an example network bounce diagram of an example series of communications between a requester 402 and responder 401 at a first destination device A and a second requester 405 and responder 406 at a second destination device B. The communication devices are interconnected via switch network represented by Switch 1 403 and Switch 2 404.

In this example, Requester A 402 transmits a write request of the first class ($WR^1$ 407) and a posted write request of the second class ($PWR^2$ 408) to Responder B 406. Responder B 406 performs the requested writes and sends an acknowledgement $PWR-ACK^2$ 411 to $PWR^2$ 408. In various implementations, Responder B 406 may also send an acknowledgement of $WR^1$ as well. However, for the sake of clarity, that acknowledgement is omitted from FIG. 3. The transaction requests of the first class are not required to maintain an ordering relationship with transactions of the second class. In this example, Switch 1 403 forwards $PWR^2$ 408 before $WR^1$ 407, reversing the order of the transactions compared to their original transmission order.

Here, Requester B 405 issues a read request of the second class ($RD^2$ 410) and a read request of the first class ($RD^1$ 409) to Responder A 401. Responder A 401 receives the read requests and prepares to send read responses $RD-RSP^1$ 412 and $RD-RSP^2$ 413 containing the requested data.

Prior to sending $RD-RSP^2$ 413, Responder A 401 queries 414 Requester A 402 to determine if there is a pending posted transaction to Destination B. When Requester A 402 receive query 414, it has not yet received $PWR-ACK^2$ 411. Accordingly, in response to query 414, Requester A 402 replies 415 that yes, there is a pending posted transaction to Destination B. In response, the Responder A 401 buffers $RD-RSP^2$ 413 and does not send it. In the case of $RD^1$ 409, the transaction is of the first class, so Responder A 401 sends $RD-RSP^1$ 412 to Requester B 405 without checking if there is a pending write request to destination B.

In this implementation, Responder A 401 repeats the query 416 to Requester A 402 to determine if there is a pending posted transaction to Destination B. Requester A 402 has received $PWR-ACK^2$ 411 before query 416. Accordingly, Requester A 402 responds 417 that there is not a pending posted transaction to Destination B. Responder A 401 then transmits $RD-RSP^2$ to Requester B 405. In an alternative implementation, Requester A 402 delays sending the response to the query 414 until after the posted write acknowledgement $PWR-ACK^2$ is received. In this implementation, the lack of a response indicates that there is a pending posted write request of the second transaction class, and Responder A 401 buffers $RD-RSP^2$ until after receiving the reply.

Figure 5:
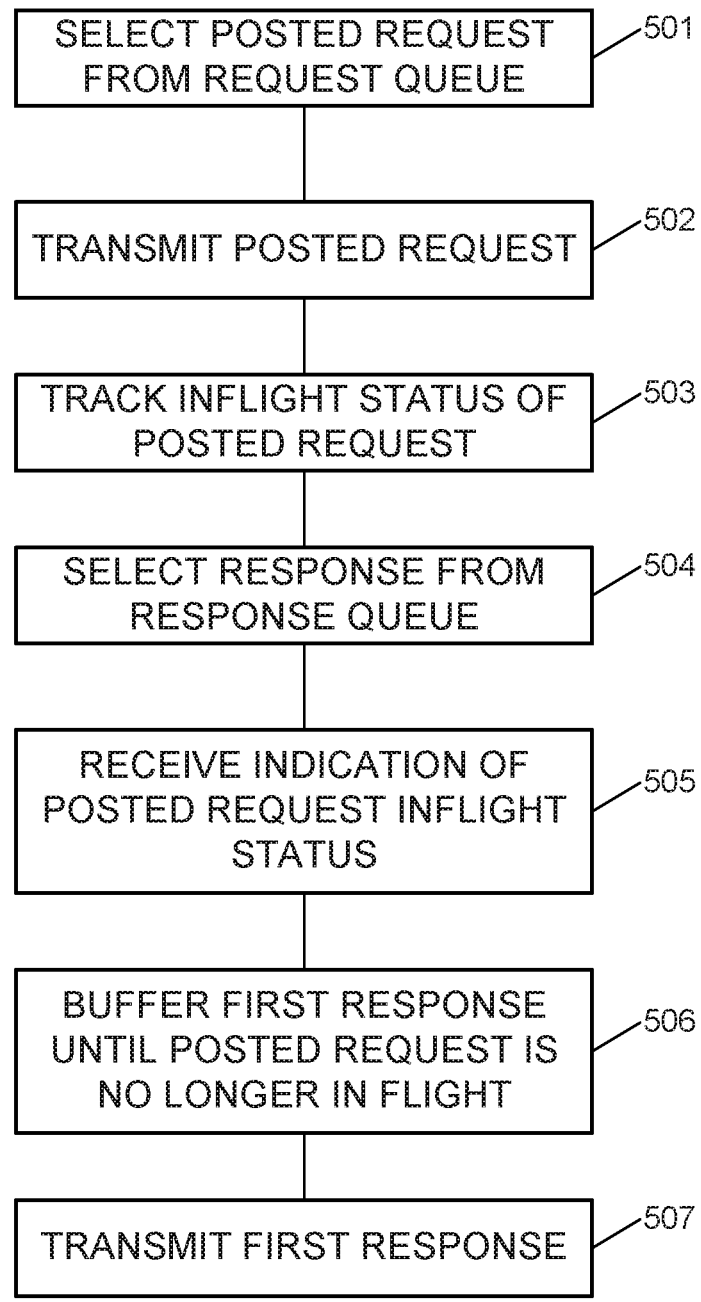
FIG. 5 illustrates an example method of operation of a bifurcated requester and responder.

FIG. 5 illustrates a method of operation of a device including a requester and a responder. For example, node 101 of FIG. 1, device 201 of FIG. 2, device 301 of FIG. 3 or Destination A of FIG. 3 may operate as described with respect to FIG. 5.

The method includes block 501. Block 501 includes a requester selecting a posted request to a destination from a request queue. As discussed above, the requester may request a request from the request queue independently of queuing and arbitration performed by the responder. The request queue may also include non-posted requests. The posted request is from an ordered transaction class and non-posted requests may be from an unordered transaction class or the ordered transaction class. For example, as discussed above, the requester may support multiple transaction classes, including an ordered transaction class and an unordered transaction class. In the ordered transaction class posted transaction requests (e.g., posted write requests) can pass non-posted requests and non-posted responses (including completion or acknowledgement packets) to the same destination, and no request or response can pass a posted request to the same destination. For example, the ordering model may be a PCIe compatible ordering model. In the unordered transaction class, all requests and responses from one destination to another may pass each other on the fabric.

The method further includes block 502. Block 502 includes the requester transmitting the posted request to the destination. For example, block 502 may comprise the requester transmitting the posted request on a first virtual channel. As discussed above, block 502 may further comprise transmitting the request independently of responses transmitted by the responder.

The method further includes block 503. Block 503 includes the requester tracking an in-flight status of the posted request. For example, block 503 may further comprise the requester receiving an acknowledgement from the destination. Here, block 503 may comprise tracking the posted request as in-flight when it is sent to the destination, and in response to the acknowledgement, updating the in-flight status of the posted request. For example, the requester may update the in-flight status of the posted request by marking the request as complete in a data structure, or removing the tracking data for the request from the data structure.

The method further includes block 504. Block 504 comprises a responder selecting a first response to the destination from a response queue. As discussed above, the responder may select the first response from the response queue independently of the requester selecting the posted request from the request queue. In some implementations, the response queue may include a mix of responses from the unordered transaction class and the ordered transaction class.

The method further includes block 505. Block 505 comprises the responder receiving a signal from the requester indicating that the posted request is in flight. For example, block 505 may include the responder querying the requester to determine if there is an in-flight posted request to the destination in response to selecting the first response. The received signal may be in response to the responder querying the requester.

The method further includes block 506. Block 506 comprises the responder buffering the first response until the responder receives a signal from the requester indicating that the posted request is not in flight. For example, the responder may repeat blocks 505 and blocks 506 to repeatedly query the requester until the responder receive the signal that the posted request is not in flight. As another example, the requester may delay sending the signal in response to the query until the posted request is not in flight.

The method further includes block 507. Block 507 comprises the responder transmitting the first response to the requester at the destination. For example, block 507 may comprise transmitting the response on a different virtual channel than the one used by the requester to transmit the posted request. As another example, block 507 may comprise transmitting the response on the same virtual channel as the posted request.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

The invention claimed is:

1. A system, comprising:
a requester to support an unordered transaction class and an ordered transaction class; and
a responder to support the unordered class of transactions and the ordered class of transactions; wherein
the requester is to:
  select a posted request to a destination from a request queue, wherein the posted request is from the ordered transaction class and the request queue includes a request from the unordered transaction class; and
  transmit the posted request to the destination; and
the responder is to:
  send transactions of the unordered class independently of transactions of the unordered class sent by the requester;
  select a first response to the destination from a response queue, wherein the first response is from the ordered transaction class and the response queue includes a second response from the unordered transaction class;
  receive a signal from the requester indicating that the posted request is in flight; and
  buffer the first response until receiving a signal from the requester indicating that the posted request is not in flight.

2. The system of claim 1, wherein:
the responder is further to receive an indication from the requester indicating whether the requester has a pending preceding posted transaction request of the ordered class before sending a non-posted transaction response of the ordered class; and
the requester is further to provide the indication to the responder after receiving an acknowledgement that the pending posted transaction request reached a first destination.

3. The system of claim 1, wherein:
the responder is to query the requester before sending a non-posted transaction response of the ordered transaction class, and
the indication is in response the query.

4. The system of claim 2, wherein:
the responder is to delay sending the non-posted transaction response until after the requester does not have any pending preceding posted transaction request of the ordered transaction class for the same destination as the non-posted transaction response.

5. The system of claim 2, wherein:
the responder is to delay sending the non-posted transaction response until after the responder does not have any pending preceding posted transaction requests of the ordered class.

6. The system of claim 2, wherein:
the responder is to send acknowledgements to received posted transaction requests of the ordered class, the acknowledgements being sent before the requested posted transactions complete.

7. The system of claim 2, wherein:
the responder is to send the non-posted transaction response on a separate virtual channel from the posted transaction request.

8. The system of claim 1, wherein:
the responder is to select responses to send independently of requests selected by the requester to send, and to buffer selected non-posted responses of the ordered transaction class until the indication is received.

9. An apparatus, comprising:
a requester to support an unordered transaction class and an ordered transaction class, comprising:
  a request queue;
  a request arbiter to select a posted transaction request to a destination from the request queue for transmission, wherein the posted transaction request is of the ordered transaction class and the request queue includes a request from the unordered transaction class;
a request transceiver to transmit the posted transaction request; and
a tracker to track end-to-end traversal of the posted transaction request of the ordered transaction class; and a responder, comprising:
a response queue;
a response arbiter to select a first transaction response to the destination from the response queue, wherein the first transaction response is of the ordered transaction class and the response queue includes a second transaction response of the unordered transaction class;
an interface to the requester to receive an indication of end-to-end traversal of the posted transaction request from the tracker;
a response transceiver to buffer the first transaction response until the interface receives the indication and, upon receiving the indication, transmit the first transaction response.

10. The apparatus of claim 9, wherein the responder further comprises:
a buffer to store the transaction response when the transaction response is of the ordered transaction class and the indication indicates that a previous posted transaction request of the ordered transaction class has not completed end-to-end traversal.

11. The apparatus of claim 9, wherein the responder further comprises:
a buffer to store the transaction response when the transaction response is of the ordered transaction class and the indication indicates that a previous posted transaction request of the ordered transaction class addressed to a same destination node as the selected transaction response has not completed end-to-end traversal.

12. The apparatus of claim 9, wherein the transceiver is to receive acknowledgements of end-to-end traversals of posted transaction requests of the ordered transaction class.

13. The apparatus of claim 9, wherein the responder is to transmit an end-to-end traversal acknowledgement to an external requester after receiving a posted transaction request of the ordered transaction class from the external requester.

14. The apparatus of claim 9, wherein the responder is to transmit the transaction response on a different virtual channel than the request transmitter is to transmit the transaction request.

15. The apparatus of claim 9, wherein the interface is used to query the tracker to receive the indication before the response arbiter selects a transaction response of the ordered transaction class.

16. The apparatus of claim 9, wherein the interface is used to query the tracker to receive the indication after the response arbiter selects a transaction response of the ordered transaction class.

17. A method, comprising:
selecting, by a requester, a posted request to a destination from a request queue, the posted request being from an ordered transaction class and the request queue including a request from an unordered transaction class;
transmitting, by the requester, the posted request to the destination;
tracking, by the requester, an in-flight status of the posted request;
selecting, by a responder, a first response to the destination from a response queue, the first response being from the ordered transaction class and the response queue including a second response from the unordered transaction class;
receiving, by the responder, a signal from the requester indicating that the posted request is in flight; and
buffering, by the responder, the first response until the responder receives a signal from the requester indicating that the posted request is not in flight.

18. The method of claim 17, further comprising:
selecting, by the responder, the first response from the response queue independently of the requester selecting the posted request from the request queue.

19. The method of claim 17, further comprising:
receiving, by the requester, an acknowledgement from the destination and, in response, updating the in-flight status of the posted request.

20. The method of claim 17, further comprising:
in response to selecting the first response, querying, by the responder, the requester to determine if there is an in-flight posted request of the ordered transaction class to the destination; and
in response to the responder querying the requester, receiving, by the responder, the signal.

* * * * *